(12) United States Patent
Kamine et al.

(10) Patent No.: US 8,877,385 B2
(45) Date of Patent: Nov. 4, 2014

(54) NON-AQUEOUS SECONDARY BATTERY

(75) Inventors: Hirokazu Kamine, Kyoto (JP);
Mitsuhiro Kishimi, Kyoto (JP); Fusaji Kita, Kyoto (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/394,736

(22) PCT Filed: Nov. 2, 2011

(86) PCT No.: PCT/JP2011/075280
§ 371 (c)(1),
(2), (4) Date: Jun. 12, 2012

(87) PCT Pub. No.: WO2013/065141
PCT Pub. Date: May 10, 2013

(65) Prior Publication Data
US 2013/0252095 A1   Sep. 26, 2013

(51) Int. Cl.
*H01M 4/62* (2006.01)
*H01M 4/131* (2010.01)
*H01M 10/05* (2010.01)
*H01M 4/02* (2006.01)
*H01M 4/36* (2006.01)
*H01M 10/052* (2010.01)

(52) U.S. Cl.
CPC ........ *H01M 4/624* (2013.01); *H01M 2004/028* (2013.01); *H01M 4/131* (2013.01); *H01M 10/05* (2013.01); *Y02E 60/122* (2013.01); *H01M 4/366* (2013.01); *H01M 4/62* (2013.01); *H01M 10/052* (2013.01); *H01M 4/621* (2013.01)

USPC ........... 429/232; 429/209; 429/212; 429/245

(58) Field of Classification Search
USPC ................................ 429/209, 212, 232, 245
See application file for complete search history.

(56) References Cited

U.S. PATENT DOCUMENTS

| | | | |
|---|---|---|---|
| 5,753,387 A * | 5/1998 | Takami et al. ................ 429/332 |
| 6,337,155 B1 | 1/2002 | Takei et al. | |
| 6,759,160 B2 * | 7/2004 | Fukuoka et al. .............. 429/128 |
| 2002/0061443 A1 * | 5/2002 | Nakanishi et al. ............ 429/223 |
| 2003/0180617 A1 * | 9/2003 | Fujimoto et al. ........... 429/231.1 |

(Continued)

FOREIGN PATENT DOCUMENTS

| | | |
|---|---|---|
| JP | 11-273662 A | 10/1999 |
| JP | 2000-182622 A | 6/2000 |

(Continued)

OTHER PUBLICATIONS

IPDL Machine Translation of JP 11-273662A (Oct. 1999).*

(Continued)

*Primary Examiner* — Gregg Cantelmo
(74) *Attorney, Agent, or Firm* — Birch, Stewart, Kolasch & Birch, LLP

(57) ABSTRACT

The non-aqueous secondary battery of the present invention includes a positive electrode, a negative electrode, a non-aqueous electrolyte and a separator. The positive electrode includes a positive electrode mixture layer containing a positive electrode active material, a conductive polymer, an organic silane compound, a conductive assistant and a binder, the conductive polymer is polythiophene or a derivative thereof, and the content of the conductive polymer is 0.05 to 0.5 mass % with respect to the total mass of the positive electrode mixture layer.

7 Claims, 1 Drawing Sheet

(56) References Cited

U.S. PATENT DOCUMENTS

| | | | |
|---|---|---|---|
| 2004/0058240 A1 | 3/2004 | Christensen | |
| 2005/0019659 A1* | 1/2005 | Shiozaki et al. | 429/231.3 |
| 2008/0135801 A1 | 6/2008 | Kizaki et al. | |

FOREIGN PATENT DOCUMENTS

| | | |
|---|---|---|
| JP | 2002-367610 A | 12/2002 |
| JP | 2004-158286 A | 6/2004 |
| JP | 2010-135310 A | 6/2010 |
| JP | 4531762 B2 | 8/2010 |
| JP | 2011-71074 A | 4/2011 |
| KR | 10-2005-0057430 A | 6/2005 |

OTHER PUBLICATIONS

IPDL Machine Translation of JP 2002-367610A (Dec. 2002).*
International Search Report dated Jul. 3, 2012, for Application No. PCT/JP2011/075280.
Japanese Office Action dated Jun. 28, 2012, for Application No. 2012-508697 with the English translation.

* cited by examiner

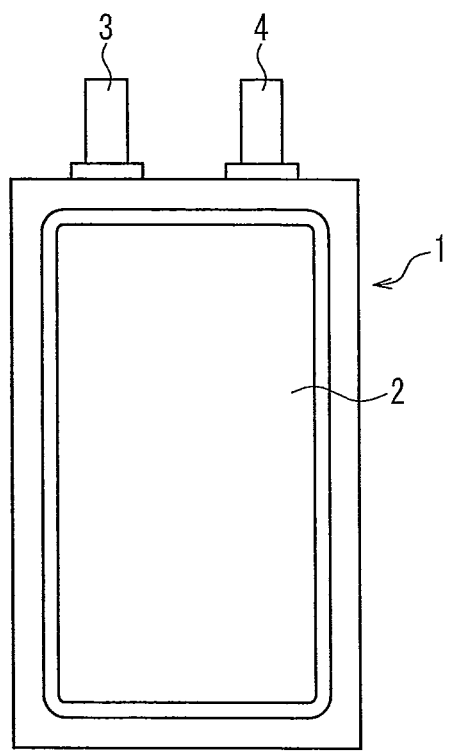

NON-AQUEOUS SECONDARY BATTERY

TECHNICAL FIELD

The present invention relates to non-aqueous secondary batteries such as lithium-ion secondary batteries.

BACKGROUND ART

Non-aqueous secondary batteries typified by lithium-ion secondary batteries are characterized by their high energy density; and thus have been widely used as power sources for portable devices such as portable phones and notebook personal computers. There is a trend toward a further increase in the capacity of lithium-ion secondary batteries as portable devices have become more sophisticated. For this reason, research and development aimed at further improving the energy density have been conducted.

On the other hand, the use of non-aqueous secondary batteries as power sources for products other than portable devices has began recently with improvements in their performance. For example, non-aqueous secondary batteries have been started to be used as power sources for automobiles, motorcycles and mobile units such as robots. To use non-aqueous secondary batteries as power sources for automobiles, motorcycles, and mobile units such as robots, their capacities need to be increased further.

One of the ways to increase the capacity of a non-aqueous secondary battery is to increase the thickness of an electrode mixture layer. However, an increase in the thickness of the electrode mixture layer may result in a decline in the capacity at the time of high-power charging/discharging. One of the causes of this decline is considered to be that the amount of active materials that become distant from the current collector increases as the thickness of the electrode mixture layer increases, thereby causing a decline in the conductivity inside the electrode. As a way to improve the conductivity inside the electrode, for example, Patent Document 1 proposes to include an electron conductive polymer in a positive electrode mixture layer.

Further, as other way to increase the capacity of a non-aqueous secondary battery, for example, Patent Document 2 proposes to coat a positive electrode active material with a silane compound.

PRIOR ART DOCUMENT

Patent Document

Patent Document 1: JP 11-273662 A (Japanese Patent No. 3699589)
Patent Document 2: JP 2002-367610

DISCLOSURE OF INVENTION

Problem to be Solved by the Invention

However, in the case of the method described in Patent Document 1, it is difficult to keep favorable battery characteristics exhibited in early stages as the electron conductive polymer decomposes over repeated charging/discharging. Further, in the case of the method described in Patent Document 2, since the positive electrode active material is coated with the silane compound, the conductivity on the surface of the positive electrode active material declines. Thus, a decline in the capacity at the time of high-power charging/discharging cannot be adequately suppressed.

With the foregoing in mind, the present invention provides a non-aqueous secondary battery having excellent high-power charge/discharge characteristics and charge/discharge cycle characteristics.

Means for Solving Problem

The non-aqueous secondary battery of the present invention is a non-aqueous secondary battery including a positive electrode, a negative electrode, a non-aqueous electrolyte and a separator. The positive electrode includes a positive electrode mixture layer containing a positive electrode active material, a conductive polymer, an organic silane compound, a conductive assistant and a binder, the conductive polymer is polythiophene or a derivative thereof, and the content of the conductive polymer is 0.05 to 0.5 mass % with respect to the total mass of the positive electrode mixture layer.

Effects of the Invention

According to the present invention, it is possible to provide a non-aqueous secondary battery having excellent high-power charge/discharge characteristics and charge/discharge cycle characteristics.

BRIEF DESCRIPTION OF THE DRAWING

FIG. 1 is a plan view of an exemplary non-aqueous secondary battery of the present invention.

DESCRIPTION OF THE INVENTION

The non-aqueous secondary battery of the present invention includes a positive electrode, a negative electrode, a non-aqueous electrolyte and a separator. The positive electrode includes a positive electrode mixture layer containing a positive electrode active material, a conductive polymer, an organic silane compound, a conductive assistant and a binder, the conductive polymer is polythiophene or a derivative thereof; and the content of the conductive polymer is 0.05 to 0.5 mass % with respect to the total mass of the positive electrode mixture layer.

The positive electrode of the non-aqueous secondary battery of the present invention includes the positive electrode mixture layer that contains polythiophene or a derivative thereof (conductive polymer), so that the conductivity of the positive electrode mixture layer improves. As a result, the conductivity of the positive electrode mixture layer does not deteriorate even if the positive electrode mixture layer has increased thickness. Further, the positive electrode of the non-aqueous secondary battery of the present invention includes the positive electrode mixture layer that contains an organic silane compound. Since the surface of the positive electrode active material is coated with the organic silane compound, the decomposition of the conductive polymer is suppressed even if the battery is charged/discharged repeatedly. In this way, due to the synergy between the conductive polymer and the organic silane compound, the present invention can provide a non-aqueous secondary battery having excellent high-power charge/discharge characteristics and charge/discharge cycle characteristics.

[Positive Electrode]

For the positive electrode of the non-aqueous secondary battery of the present invention, it is possible to use a positive electrode including, for example, a current collector and a positive electrode mixture layer formed on one side or both sides of the current collector and containing a positive electrode active material, a conductive polymer, an organic silane compound, a conductive assistant, a binder, and the like.

<Conductive Polymer>

The conductive polymer used in the present invention is polythiophene or a derivative thereof. Polythiophene or a derivative thereof has both electron conductivity and lithium-ion conductivity. For this reason, the incorporation of polythiophene or a derivative thereof into the positive electrode mixture layer results in improvements in the conductivity of the positive electrode mixture layer.

The content of the conductive polymer is 0.05 to 0.5 mass % with respect to the total mass of the positive electrode mixture layer. If the content of the conductive polymer is in this range, improvements in the conductivity of the positive electrode mixture layer can be achieved adequately.

Hereinafter, polythiophene or a derivative thereof used in the present invention will be described. It should be noted that the present invention is not limited thereto.

Polythiophene or a derivative thereof used in the present invention preferably is polythiophene represented by the following general formula (1) and having repeat units of thiophene (α) or a derivative thereof, or polythiophene represented by the following general formula (2) and having repeat units of thiophene (β) or a derivative thereof. Since these polythiophenes or derivatives thereof have an ether group at the third position of the thiophene ring, they have improved lithium-ion conductivity than that of conventional polythiophenes. Thus, the internal resistance and electrical resistance of the positive electrode mixture layer decline significantly, allowing improvements in the output characteristics and in the cycle characteristics at the time of high-speed charging/discharging. Further, in terms of the conductivity, it is more preferable to use polythiophene represented by the following general formula (2) and having repeat units of thiophene (β) or a derivative thereof because steric hindrance of substituents is relieved.

[Chemical Formula 1]

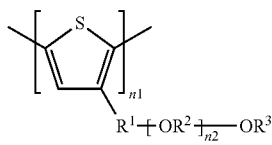

(1)

[Chemical Formula 2]

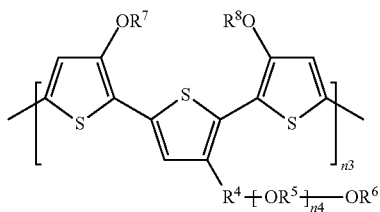

(2)

In the general formula (1) or (2), $R^1$ and $R^4$ each represent a hydrogen atom or methyl group and $OR^2$ and $OR^5$ each represent an oxyethylene group. Further, in the general formula (1) or (2), $R^3$ and $R^6$ each represent an oxyethylene group. The methyl group at the terminal position may be an alkyl fluoride group in which a fluorine atom substitutes for a hydrogen atom of a methyl group. Examples of the alkyl fluoride groups include alkyl fluoride in which fluorine atoms substitute 1 to 3 hydrogen atoms. Further, in the general formula (2), $OR^7$ and $OR^8$ each represent an oxymethylene group, oxyethylene group, oxypropylene group or oxybutylene group, and preferably represent an oxymethylene group in terms of the conductivity. Furthermore, in the general formula (1) or (2), n1 represents an integer of 1 to 10000, n2 represents an integer of 0 to 5, n3 represents an integer of 1 to 10000, and n4 represents an integer of 0 to 5.

Polythiophene or a derivative thereof used in the present invention can be synthesized by known methods such as anionic polymerization and oxidation polymerization of monomers respectively corresponding to thiophene repeat units.

<Organic Silane Compound>

The organic silane compound used in the present invention coates the surface of the positive electrode active material in the positive electrode mixture layer, so that the decomposition of the conductive polymer (polythiophene or a derivative thereon can be suppressed even if the battery is charged/discharged repeatedly. Thus, even if the battery is charged/discharged repeatedly, it is possible to maintain the effect of improving the conductivity of the positive electrode mixture layer resulting from incorporating the conductive polymer into the positive electrode mixture layer.

The content of the organic silane compound is preferably 0.05 to 3.0 mass % with respect to the total mass of the positive electrode mixture layer. When the content of the organic silane compound is in this range, it is possible to adequately suppress the decomposition of the conductive polymer.

Examples of the organic silane compound include compounds represented by the general formulas $X^1$—$Si(OR^1)_3$ and $X^2$—$SiR^2(OR^3)_2$, where $R^1$, $R^2$ and $R^3$ each represent —$CH_3$, —$C_2H_5$ or —$C_3H_7$, $R^2$ and $R^3$ may be the same or different from each other, and $X^1$ and $X^2$ each represent any of various functional groups and may be —$Si(OR^1)_3$ or —$SiR^2(OR^3)_2$.

Examples of the organic silane compound include: organic silane compounds having a vinyl group, such as vinyltrichlorosilane, vinyltrimethoxysilane and vinyltriethoxysilane; organic silane compounds having an epoxy group, such as 2-(3,4-epoxycyclohexyl)ethyltrimethoxysilane, 3-glycidoxypropyl trimethoxysilane, 3-glycidoxypropylmethyldiethoxysilane, 3-glycidoxypropyltriethoxysilane; organic silane compounds having a styryl group, such as p-styryltrimethoxysilane; organic silane compounds having a methacryloxy group, such as 3-methacryloxypropylmethyldimethoxysilane, 3-methacryloxypropyltrimethoxysilane, 3-methacryloxypropylmethyldimethoxysilane and 3-methacryloxypropyltriethoxysilane; organic silane compounds having an acryloxy group, such as 3-acryloxypropyltrimethoxysilane; organic silane compounds having an amino group, such as N-2-(aminoethyl)-3-aminopropylmethyldimethoxysilane, N-2-(aminoethyl)-3-aminopropyltrimethoxysilane, 3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane and hydrochloride thereof; organic silane compounds having an ureide group, such as 3-ureidepropyltriethoxysilane; organic silane compounds having a chloropropyl group, such as 3-chloropropyltrimethoxysilane; organic silane compounds having a mercapto group, such as 3-mercaptopropylmethyldimethoxysilane and 3-mercaptopropyltrimethoxysilane; organic silane compounds having a sulfide group, such as bis(triethoxysilylpropyl)tetrasulfide; and organic silane compounds having an isocyanate group, such as 3-isocyanatepropyltriethoxysilane.

These organic silane compounds may be used individually or in combination of two or more. Among these organic silane compounds, those with a boiling point of 200° C. or higher are more preferable. Since organic silane compounds with a boiling point of 200° C. or lower may evaporate during the production of the positive electrode mixture layer, the effect resulting from using the organic silane compound may decline.

<Positive Electrode Active Material>

The positive electrode active material used in the positive electrode is preferably a lithium-containing composite oxide containing lithium (Li), nickel (Ni), cobalt (Co) and manganese (Mn) as constituent elements and having a layer structure. Ni and Co contribute to improvements in the capacity of the battery and Mn contributes to improvements in the thermal stability of the lithium-containing composite oxide.

As the lithium-containing composite oxide used in the present invention, it is particularly preferable to use one represented by the following general formula (3) in view of the positive electrode active material's other characteristics such as high potential stability

$$Li_{1+y}MO_2 \tag{3}$$

where y satisfies $-0.15 \leq y \leq 0.15$, M is a group of elements including Ni, Co and Mn, and the relationships $25 \leq a \leq 90$, $5 \leq b \leq 35$, $5 \leq c \leq 35$, and $10 \leq b+c \leq 70$ are established, where a, b, and c represent the percentages of the number of elements of Ni, Co, and Mn in the element group M to the total number of elements in the element group M, respectively, in mol %.

In terms of improving the capacity of the lithium-containing composite oxide, "a" as the percentage of Ni is preferably 25 mol % or more, and more preferably 50 mol % or more, where the total number of elements in the element group M is 100 mol % in the general composition formula (3) representing the lithium-containing composite oxide. When Ni makes up an excessive proportion of the element group M, the amount of Co and Mn declines, for example, so that the effects resulting these elements may decline. Thus, "a" as the percentage of Ni is preferably 90 mol % or less, and more preferably 70 mol % or less, where the total number of elements in the element group M is 100 mol % in the general composition formula (3) representing the lithium-containing composite oxide.

Further, while Co contributes to improvements in the capacity of the lithium-containing composite oxide and has the effect of improving the filling density of the positive electrode mixture layer, it may cause an increase in cost and a reduction in the level of safety when being contained excessively. Thus, "b" as the percentage of Co is preferably 5 mol % or more and 35 mol % or less, where the total number of elements in the element group M is 100 mol % in the general composition formula (3) representing the lithium-containing composite oxide.

Further, in the lithium-containing composite oxide, "c" as the percentage of Mn is preferably 5 mol % or more and 35 mol % or less, where the total number of elements in the element group M in the general composition formula (3) is 100 mol %. By including Mn in the lithium-containing composite oxide in such an amount and ensuring the presence of Mn in the crystal lattice, the thermal stability of the lithium-containing composite oxide can be improved and a battery with a higher level of safety can be configured.

Moreover, the inclusion of Co in the lithium-containing composite oxide prevents variations in the valence of Mn associated with doping and de-doing of Li caused by charging/discharging of a battery. As a result, the average valence of Mn can be stabilized at around 4 and the reversibility of charging/discharging can be further improved. Thus, by using such a lithium-containing composite oxide, it is possible to configure a battery having more favorable charge/discharge cycle characteristics.

Further, in the lithium-containing composite oxide, in terms of favorably ensuring the effects resulting from the combined use of Co and Mn, the sum of "b" as the percentage of Co and "c" as the percentage of Mn (i.e., b+c) is preferably 10 mol % or more and 70 mol % or less, and more preferably 10 mol % or more and 50 mol % or less, where the total number of elements in the element group M in the general formula (3) is 100 mol %.

<Binder>

Both thermoplastic and thermosetting resins can be used as the binder used in the positive electrode as long as they are chemically stable in the battery. Examples of the binder include polyvinylidene fluoride (PVDF), polyethylene, polypropylene, polytetrafluoroethylene (PTFE), polyhexafluoropropylene (PHFP), styrene-butadiene rubber (SBR), tetrafluoroethylene-hexafluoroethylene copolymer, tetrafluoroethylene-hexafluoropropylene copolymer (FEP), tetrafluoroethylene-perfluoroalkylvinyl ether copolymer (PFA), ethylene-tetrafluoroethylene copolymer (ETFE), polychlorotrilluoroethylene (PCTFE), propylene-tetrafluoroethylene copolymer, and ethylene-chlorotrifluoroethylene copolymer (ECTFE), or ethylene-acrylic acid copolymer, ethylene-methacrylic acid copolymer, ethylene-methyl acrylate copolymer, ethylene-methyl methacrylate copolymer, and an Na ion crosslinked body of these copolymers. These materials may be used individually or in combination of two or more.

The content of the binder is preferably 5.0 mass % or less, and more preferably 4.0 mass % or less with respect to the total mass of the positive electrode mixture layer. When the amount of the binder in the positive electrode mixture layer is excessive, the adhesion between the positive electrode mixture layer and the current collector becomes too strong. Thus, in a wound electrode assembly using such a positive electrode, defects such as cracks are likely to occur in the positive electrode mixture layer on the inner radius side.

Further, in terms of improving the capacity of the positive electrode, it is preferable to reduce the amount of the binder in the positive electrode mixture layer to increase the content of the positive electrode active material. However, if the amount of the binder in the positive electrode mixture layer is too small, the flexibility of the positive electrode mixture layer declines. In the case of a wound electrode assembly using such a positive electrode, this leads to deterioration of the wound electrode assembly in shape (particularly on the outer radius side) and may impair the productivity of the positive electrode, and by extension, the productivity of a battery using the positive electrode. For these reasons, the content of the binder is preferably 0.5 mass % or more, and more preferably 1.0 mass % or more with respect to the total mass of the positive electrode mixture layer.

<Conductive Assistant>

The conductive assistant used in the positive electrode is not particularly limited as long as it is chemically stable in the battery. Examples of the conductive assistant include: graphites such as natural graphite and artificial graphite; carbon blacks such as acetylene black, Ketjen Black (trade name), channel black, furnace black, lamp black, and thermal black; conductive fibers such as carbon fiber and metal fiber; metal powders such as aluminum powder; fluorocarbon; zinc oxide;

conductive whiskers made of potassium titanate and the like; conductive metal oxides such as titanium oxide; and organic conductive materials such as polyphenylene derivative. These materials may be used individually or in combination of two or more. Among these materials, graphites and carbon blacks are preferred because graphites have high conductivity and carbon blacks have excellent liquid absorbency. Further, the conductive assistant is not limited to be in the form of primary particles, and can be in the form of an aggregate such as a secondary aggregate or chain structure. The conductive assistant in the form of an aggregate is easier to handle, so that the productivity becomes favorable.

As the content of the conductive assistant, it is preferable that the relationship A/B≥1 is established, where A is the content of the conductive assistant in mass % with respect to the total mass of the positive electrode mixture layer and B is the content of the binder in mass % with respect to the total mass of the positive electrode mixture layer. If the content of the conductive assistant is in this range, it is possible to adequately improve the conductivity of the positive electrode mixture layer.

<Current Collector>

As the current collector used in the positive electrode, it is possible to use any of conventionally known current collectors used in positive electrodes for lithium-ion secondary batteries. For example, an aluminum foil having a thickness of 10 to 30 μm is preferred.

<Production of Positive Electrode>

For example, the positive electrode can be produced by dispersing in a solvent such as N-methyl-2-pyrolidone (NMP) the positive electrode active material, the conductive polymer, the organic silane compound, the conductive assistant and the binder described above (note that the binder may be dissolved in the solvent) to prepare a positive electrode mixture containing composition in the form of a paste or slurry, applying the obtained composition onto one side or both sides of a current collector, drying the applied composition, and optionally subjecting the current collector to calendering after the drying. The method for producing the positive electrode is not limited to this, and the positive electrode may be produced by other production methods.

<Positive Electrode Mixture Layer>

The thickness of the positive electrode mixture layer is preferably 70 to 300 μm per one side of the current collector after the calendering. By setting the thickness of the positive electrode mixture layer to be in this range and making the thickness as large as possible, the capacity of the non-aqueous secondary battery can be increased.

[Negative Electrode]

For the negative electrode of the non-aqueous secondary battery of the present invention, it is possible to use a negative electrode including, for example, a current collector and a negative electrode mixture layer formed on one side or both sides of the current collector and containing a negative electrode active material, a binder, and optionally a conductive assistant.

<Negative Electrode Active Material>

The negative electrode active material used in the negative electrode is not particularly limited as long as it is a conventionally known negative electrode active material used in lithium-ion secondary batteries, i.e., a material capable of intercalating/deintercalating lithium ions. For example, as the negative electrode active material, carbon materials capable of intercalating/deintercalating lithium ions such as graphites, pyrolytic carbons, cokes, glassy carbons, calcined organic polymer compounds, mesocarbon microbeads (MCMB) and carbon fibers can be used individually or in combination of two or more. Further, as the negative electrode active material, it is also possible to use elements such as silicon (Si), tin (Sn), germanium (Ge), bismuth (Bi), antimony (Sb), and indium (In) and alloys thereof, compounds capable being charged/discharged at a low voltage similar to lithium metals, such as lithium-containing nitrides or lithium-containing oxides, or lithium metal and lithium/aluminum alloy. Among these materials, materials containing silicon and oxygen as constituent elements and represented by the formula $SiO_x$ are preferred as the negative electrode active material.

$SiO_x$ may include an Si microcrystalline phase or Si amorphous phase. In this case, the atomic ratio between Si and O is a ratio including Si in the Si microcrystalline phase or Si amorphous phase. That is, materials represented by $SiO_x$ include those having a structure in which Si (e.g., microcrystalline Si) is dispersed in an amorphous $SiO_2$ matrix. In this case, the atomic ratio x, including the amorphous $SiO_2$ and Si dispersed in the amorphous $SiO_2$, may satisfy $0.5 \leq x \leq 1.5$. For example, in the case of a material having a structure in which Si is dispersed in an amorphous $SiO_2$ matrix and the mole ratio between $SiO_2$ and Si is 1:1, x is equal to 1 (x=1). Thus, this material can be represented by the structural formula SiO. When a material having such a structure is analyzed by, for example, X-ray diffractometry, a peak resulting from the presence of Si (microcrystalline Si) may not be observed. However, when the material is observed under a transmission electron microscope, the presence of impalpable Si can be recognized.

$SiO_x$ mentioned above is preferably a composite combined with a carbon material. For example, it is desirable that the surface of $SiO_x$ is coated with a carbon material. Generally, $SiO_x$ is poor in conductivity. Thus, when using $SiO_x$ as a negative electrode active material, it is necessary to form an excellent conductive network in terms of ensuring favorable battery characteristics by using a conductive material (conductive assistant) and allowing $SiO_x$ and the conductive material to be mixed and dispersed favorably in the negative electrode. When a composite obtained by combining $SiO_x$ and a carbon material is used, a conductive network is formed more favorably in the negative electrode than using a material obtained by simply mixing $SiO_x$ and a conductive material such as a carbon material.

That is, while $SiO_x$ generally has a specific resistance of $10^3$ to $10^7$ kΩcm, the carbon materials described above as examples generally have a specific resistance of $10^{-5}$ to 10 kΩcm. Thus, by combining $SiO_x$ and any of the carbon materials, the conductivity of $SiO_x$ can be improved.

In addition to the composite obtained by coating the surface of $SiO_x$ with a carbon material as described above, examples of the $SiO_x$-carbon material composite include granules of $SiO_x$ and a carbon material.

Preferred examples of carbon materials that can be used to form a composite with $SiO_x$ include carbon materials such as low crystalline carbon, carbon nanotube, and vapor-grown carbon fiber.

To be more specific, the carbon material is preferably at least one material selected from the group consisting of a fibrous or coil-shaped carbon material, carbon black (including acetylene black and Ketjen Black), artificial graphite, easily graphitizable carbon, and hardly graphitizable carbon. A fibrous or coil-shaped carbon material is preferable because it facilitates the formation of a conductive network and has a large surface area. Carbon black (including acetylene black and Ketjen Black), easily graphitizable carbon and hardly graphitizable carbon are preferable because they have high electrical conductivity and outstanding liquid-holding ability, and moreover they have the property of readily maintaining contact with $SiO_x$ particles even if the particles expand and/or shrink.

Among the carbon materials described above as examples, it is particularly preferable to use a fibrous carbon material when forming, together with $SiO_x$, a composite in the form of granules. Since a fibrous carbon material has a thin thready shape and is highly flexible, it can respond to expansion and/or shrinkage of $SiO_x$ associated with charging/discharging of the battery. Also, the fibrous carbon material has a large bulk density, so that it can have many contacts with $SiO_x$ particles. Examples of the fibrous carbon include polyacrylonitrile (PAN) carbon fiber, pitch carbon fiber, vapor-grown carbon fiber, and carbon nanotube, and any of these materials may be used.

When using the $SiO_x$-carbon material composite in the negative electrode, the ratio of the carbon material to $SiO_x$ is preferably 5 parts by mass or more, and more preferably 10 parts by mass or more carbon material to 100 parts by mass $SiO_x$ in terms of favorably achieving the effects resulting from combining $SiO_x$ with the carbon material. When the carbon material combined with $SiO_x$ makes up an excessive proportion of the composite, it may lead to a decline in the amount of $SiO_x$ in the negative electrode mixture layer, so that the effect of increasing the capacity may decline. For this reason, the ratio of the carbon material to $SiO_x$ is preferably 50 parts by mass or less, and more preferably 40 parts by mass or less carbon material to 100 parts by mass $SiO_x$.

For example, the $SiO_x$-carbon material composite can be obtained as follows.

When producing the composite by coating the surface of $SiO_x$ with a carbon material, $SiO_x$ particles and hydrocarbon gas are heated in a vapor phase to deposit on the surface of the particles carbon resulting from the thermal decomposition of the hydrocarbon gas. In this way, the hydrocarbon gas can be distributed throughout the $SiO_x$ particles by chemical-vapor deposition (CVD), so that a thin and uniform coating containing the conductive carbon material (i.e., carbon material coating layer) can be formed on the surface of the particles. Thus, conductivity can be imparted to the $SiO_x$ particles uniformly by using a small amount of carbon material.

In the production of $SiO_x$ coated with the carbon material, the treatment temperature (atmospheric temperature) of CVD varies depending on the type of hydrocarbon gas used, but generally 600 to 1200° C. is suitable. In particular, the treatment temperature is preferably 700° C. or more, and more preferably 800° C. or more. This is because higher treatment temperature leads to lesser residual impurities and allows the formation of the coating layer containing highly conductive carbon.

Although toluene, benzene, xylene, mesitylene or the like can be used as the liquid source of the hydrocarbon gas, toluene is particularly preferable because it is ease to handle. The hydrocarbon gas can be obtained by evaporating (e.g., bubbling with nitrogen gas) any of these liquid sources. It is also possible to use methane gas, acetylene gas, and the like.

When producing granules of $SiO_x$ and a carbon material, a dispersion is prepared by dispersing $SiO_x$ in a dispersion medium. Then, the dispersion is sprayed and dried to produce granules including a plurality of particles. For example, ethanol or the like can be used as the dispersion medium. It is suitable to spray the dispersion generally in a 50 to 300° C. atmosphere. In addition to this method, granules of $SiO_x$ and a carbon material can be produced by mechanical granulation using a vibration or planetary ball mill or rod mill.

The $SiO_x$-carbon material composite preferably makes up 0.01 mass % or more, more preferably 1 mass % or more, and even more preferably 3 mass % or more of the negative electrode active material contained in the negative electrode in terms of favorably ensuring the effect resulting from using $SiO_x$, i.e., the effect of increasing the capacity. Further, the $SiO_x$-carbon material composite preferably makes up 20 mass % or less, and more preferably 15 mass % or less of the negative electrode active material in terms of favorably avoiding problems resulting from changes in the volume of $SiO_2$ associated with charging/discharging.

<Binder>

As the binder used in the negative electrode, examples include: polysaccharides such as starch, polyvinyl alcohol, polyacrylic acid, carboxymethyl cellulose (CMC), hydroxypropyl cellulose, regenerated cellulose and diacetyl cellulose and modified products thereof; thermoplastic resins such as polyvinyl chloride, polyvinyl pyrrolidone (PVP), polytetrafluoroethylene, polyvinylidene fluoride, polyethylene, polypropylene, polyamideimide, and polyamide and modified products thereof; polyimide; elastically resilient polymers such as ethylene-propylene-dieneter polymer (EPDM), sulfonated EPDM, styrene butadiene rubber (SBR), butadiene rubber, polybutadiene, fluorocarbon rubber and polyethylene oxide and modified products thereof. These materials may be used individually or in combination of two or more.

<Conductive Assistant>

A conductive material may further be added to the negative electrode mixture layer as a conductive assistant. Such a conductive material is not particularly limited as long as it does not chemically react in the battery. For example, materials such as carbon black (e.g., thermal black, furnace black, channel black, Ketjen Black, and acetylene black), carbon fiber, metal powders (e.g., powders of copper, nickel, aluminum, and silver), metal fiber, polyphenylene derivative (the one described in JP 59-20971 A) can be used individually or in combination of two or more. Among these materials, it is preferable to use carbon black, and more preferably Ketjen Black or acetylene black.

<Current Collector>

As the current collector used in the negative electrode, a metal foil, punched metal, metal mesh, expanded metal or the like made of copper or nickel can be used, but generally a copper foil is used. When reducing the thickness of the negative electrode as a whole to achieve a battery with a high energy density; an upper limit to the thickness of the negative electrode current collector is preferably 30 μm and a lower limit to the thickness of the negative electrode current collector is desirably 5 μm in order to ensure the mechanical strength.

<Production of Negative Electrode>

For example, the negative electrode can be produced by dispersing in a solvent such as N-methyl-2-pyrolidone (NMP) or water the negative electrode active material, the binder, and optionally the conductive assistant as described above (note that the binder may be dissolved in the solvent) to prepare a negative electrode mixture containing composition in the form of a paste or slurry, applying the obtained composition onto one side or both sides of the current collector, drying the applied composition, and optionally subjecting the current collector to calendering after the drying. The method for producing the negative electrode is not limited to this, and the negative electrode may be produced by other production methods.

<Negative Electrode Mixture Layer>

In the negative electrode mixture layer, it is preferable that the total amount of the negative electrode active material is 80 to 99 mass % and the amount of the binder is 1 to 20 mass %. Further, when additionally using a conductive material as a conductive assistant, the conductive material is preferably used in the negative electrode mixture layer to the extent that the total amount of the negative electrode active material and the amount of the binder satisfy the preferred values. In view of the thickness of the positive electrode mixture layer as described above, the thickness of the negative electrode mixture layer is preferably 50 to 400 µm, for example.

[Non-aqueous Electrolyte]

As the non-aqueous electrolyte used in the non-aqueous secondary battery of the present invention, it is possible to use a non-aqueous electrolyte obtained by dissolving lithium salt in an organic solvent.

Lithium salt to be used in the non-aqueous electrolyte is not particularly limited as long as it dissociates in the solvent to produce lithium ions and is less susceptible to side reactions such as decomposition in the working voltage range of the battery. For example, inorganic lithium salts such as $LiClO_4$, $LiPF_6$, $LiBF_4$, $LiAsF_6$ and $LiSbF_6$ and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ (2≤n≤7) and LiN$(RfOSO_2)_2$ (where Rf represents a fluoroalkyl group) can be used.

The concentration of this lithium salt in the non-aqueous electrolyte is preferably 0.5 to 1.5 mol/L, and more preferably 0.9 to 1.25 mol/L.

An organic solvent to be used in the non-aqueous electrolyte is not particularly limited as long as it dissolves the lithium salt and does not cause side reactions such as decomposition in the working voltage range of the battery. Examples of the organic solvents include: cyclic carbonates such as ethylene carbonate, propylene carbonate, and butylene carbonate; chain carbonates such as dimethyl carbonate, diethyl carbonate and methyl ethyl carbonate; chain esters such as methyl propionate; cyclic esters such as γ-butyrolactone; chain ethers such as dim ethoxyethane, diethyl ether, 1,3-dioxolane, diglyme, triglyme and tetraglyme; cyclic ethers such as dioxane, tetrahydrofuran and 2-methyltetrahydrofuran; nitriles such as acetonitrile, propionitrile and methoxypropionitrile; and sulfurous esters such as ethylene glycol sulfite. These may be used in combination of two or more. It is desirable to use those capable of providing high conductivity when used in combination, for example, a mixed solvent of ethylene carbonate and chain carbonate in order to achieve a battery with more favorable characteristics.

[Separator]

The separator used in the non-aqueous secondary battery of the present invention preferably has the property of being able to dose its pores (i.e., shutdown function) at 80° C. or higher (more preferably 100° C. or higher) and 170° C. or lower (more preferably 150° C. or lower). Separators generally used in lithium-ion secondary batteries, for example, microporous films made of polyolefin such as polyethylene (PE), polypropylene (PP) or the like can be used. For example, the separator may be composed of a microporous film made only of PE or PP or may be composed of a laminate of a PE microporous film and a PP microporous film.

[Form of Battery]

The non-aqueous secondary battery of the present invention may be in the form of a cylindrical. (circular or rectangular cylindrical) battery using an outer can such as a steel can or aluminum can. Further, the non-aqueous secondary battery of the present invention may be in the form of a soft package battery using a metal-deposited laminated film as an outer package.

EXAMPLES

Hereinafter, the present invention will be described in detail by way of Examples. It should be noted that the present invention is not limited to Examples described below.

Example 1

<Synthesis of Conductive Polymer>

Poly{3-(2,5-dioxaheptyl)thiophene} as a conductive polymer was synthesized as follows.

(1) Step 1: Synthesis of 3-bromomethylthiophene 5 parts by mass of 3-methylthiophene (manufactured by Tokyo Chemical Industry Co. Ltd) (50.9 mmol), 9.97 parts by mass of N-bromosuccinimide (56.0 mmol), and 0.12 parts by mass of dibenzoylperoxide (manufactured by Tokyo Chemical Industry Co. Ltd) (0.50 mmol) were dissolved in 30 parts by mass of benzene. Thereafter, the solution was heated to 100° C. to let the components react with each other for 4 hours. After the reaction, the reaction solution was cooled to ambient temperature, and 30 parts by mass of 1M aqueous solution of sodium thiosulfate was added to the reaction solution. Then, the reaction solution was poured into a separatory funnel to separate the water layer. Further, the organic layer remaining was washed twice with 30 parts by mass of distilled water, and then benzene was distilled off, thus obtaining 3-bromomethylthiophene.

(2) Step 2: Synthesis of 3-(2,5-dioxaheptyl)thiophene 3.54 parts by mass of 2-ethoxyethanol (39.3 mmol) was dissolved in 15 parts by mass of tetrahydrofuran (THF), and sodium hydride (60% of sodium hydride being dispersed in paraffin) was added to the solution. Then, into this solution, a solution prepared by dissolving in 15 parts by mass of THF 6.32 parts by mass of 3-bromomethylthiophene (35.7 mmol) obtained in the step 1 was dropped over 2 hours. Subsequently, the solution was heated to 100° C. to let the components react with each other for 4 hours. After the reaction, the reaction solution was cooled to ambient temperature, and 30 parts by mass of distilled water was added to the reaction solution. Thereafter, the reaction solution was poured into a separatory funnel to separate the water layer. Further, the organic layer remaining was washed twice with 30 parts by mass of distilled water, and then THF was distilled off. Subsequently, the mixture obtained was purified using a silica gel column, thus obtaining 3-(2,5-dioxaheptyl)thiophene.

(3) Step 3: Synthesis of 2,5-dibromo-3-(2,5-dioxaheptyl)thiophene 5.68 parts by mass of 3-(2,5-dioxaheptyllthiophene (30.5 mmol) obtained in the step 2 and 11.9 parts by mass of N-bromosuccinimide (67.1 mmol) were dissolved in THF and were reacted with each other for 2 hours at ambient temperature. After the reaction, 50 parts by mass of ethyl acetate was added to the reaction solution, and a precipitate was removed from the reaction solution through a glass filter, and THF and ethyl acetate were distilled off. Then, the mixture obtained was purified using a silica gel column, thus obtaining 2,5-dibromo-3-(2,5-dioxaheptyllthiophene.

(4) Step 4: Synthesis of poly{3-(2,5-dioxaheptyl)thiophene}

8.11 parts by mass of 2,5-dibromo-3-(2,5-dioxaheptyllthiophene (23.6 mmol) obtained in the step 3 was dissolved in 30 parts by mass of THF. Then, to this solution, 25 parts by mass of THF solution of methylmagnesium bromide was added, and the components were reacted with each other for 30 minutes at 75° C. To this reaction solution, 0.127 parts by mass of [1,3-bis(diphenylphosphino)propane]-dichloronickel (II) was added, and the components were further reacted with each other for 2 hours at the same temperature, i.e., at 75° C. After cooling the reaction solution to ambient temperature, 5 parts by mass of methanol was added to the reaction solution. Next, the reaction mixture was placed into a Soxhlet extractor, and was washed first with 150 parts by mass of methanol and then with 150 parts by mass of hexane. Finally, the residue was extracted using 150 parts by mass of chloroform, and then the solvent was distilled off, thus obtaining poly{3-(2,5-dioxaheptyl)thiophene}.

<Preparation of Conductive Polymer-Binder Solution>

A proper amount of NMP was added to 0.23 parts by mass of poly{3-(2,5-dioxaheptyl)thiophene} as a conductive polymer synthesized above and 2.3 parts by mass of PVDF as a binder, followed by stirring, thus preparing a conductive polymer-binder solution.

<Production of Positive Electrode>

92.27 parts by mass of $LiNi_{0.5}Co_{0.2}Mn_{0.3}O_2$ as a positive electrode active material, 0.3 parts by mass of bis(triethoxysilylpropyl)tetrasulfide ("KBE-846" manufactured by Shin-Etsu Chemical Co., Ltd.) as an organic silane compound, 4.6 parts by mass of acetylene black as a conductive assistant, and 0.3 parts by mass of polyvinylpyrolidone (PVP) as a dispersion medium were mixed with each other, and then the conductive polymer-binder solution containing 0.23 parts by mass of poly{3-(2,5-dioxaheptyl)thiophene} as a conductive polymer and 2.3 parts by mass of PVDF as a binder was added to the mixture. A proper amount of NMP was further added to the mixture, and mixing and dispersion of the components were carried out in a planetary mixer, thus preparing a positive electrode mixture containing slurry. Next, onto one side of an aluminum foil as a positive electrode current collector having a thickness of 15 μm, the positive electrode mixture containing slurry was applied in a certain thickness, followed by drying at 85° C. Thereafter, drying was carried out in a vacuum at 100° C. for 8 hours. Subsequently, the current collector was subjected to pressing by a roll pressing machine, thus producing a positive electrode including a positive electrode mixture layer. The positive electrode mixture layer had a thickness of 90 μm after the pressing. When the positive electrode mixture containing slurry was applied to the aluminum foil, the slurry was not applied to a portion of the aluminum foil so that this portion would be exposed.

Next, this positive electrode was cut so that the positive electrode mixture layer would be 30 mm×30 mm in area and the exposed portion of the aluminum foil was kept included in the positive electrode. Further, a lead piece made of aluminum for taking out current was welded to the exposed portion of the aluminum foil, thus obtaining a positive electrode with leads.

<Production of Negative Electrode>

A proper amount of water was added to a negative electrode mixture containing 96 parts by mass of graphite as a negative electrode active material and 2 parts by mass of carboxymethylcellulose (CMC) and 2 parts by mass of styrene butadiene rubber (SBR) as binders. Then, mixing and dispersion of the components were carried out in a planetary mixer, thus preparing a negative electrode mixture containing slurry. Next, onto one side of a copper foil as a negative electrode current collector having a thickness of 7 μm, the negative electrode mixture containing slurry was applied in a certain thickness, followed by drying at 85° C. Thereafter, drying was carried out in a vacuum at 100° C. for 8 hours. Subsequently, the current collector was subjected to pressing by a roll pressing machine, thus producing a negative electrode including a negative electrode mixture layer having a thickness of 100 μm. When the negative electrode mixture containing slurry was applied to the copper foil, the slurry was not applied to a portion of the copper foil so that this portion would be exposed.

Next, this negative electrode was cut so that the negative electrode mixture layer would be 35 mm×35 mm in area and the exposed portion of the copper foil was kept included in the negative electrode. Further, a lead piece made of nickel for taking out current was welded to the exposed portion of the copper foil, thus obtaining a negative electrode with leads.

<Assembly of Battery>

The positive electrode with leads and the negative electrode with leads were laminated via a microporous PE film separator (thickness: 18 μm) to form a laminated electrode assembly, and the laminated electrode assembly was housed in an outer package made of a 90 mm×160 mm aluminum laminate film. In this example, the ratio between the positive electrode active material and the negative electrode active material in mass was 1.5. Subsequently, a non-aqueous electrolyte was prepared by dissolving $LiPF_6$ in a mixed solvent of ethylene carbonate and dim ethyl carbonate at a volume ratio of 2:8 such that the concentration of $LiPF_6$ in the electrolyte would be 1.2 mol/L, and 1 mL of the non-aqueous electrolyte was injected into the outer package. Then, the outer package was sealed, thus obtaining a laminated non-aqueous secondary battery.

FIG. 1 is a plan view of the laminated non-aqueous secondary battery obtained. In the laminated non-aqueous secondary battery 1 of this example shown in FIG. 1, the laminated electrode assembly and the non-aqueous electrolyte are contained in the outer package 2 made of an aluminum laminate film having a rectangular shape when seen in a plan view. A positive electrode external terminal 3 and a negative electrode external terminal 4 are drawn out from the same side.

Example 2

A laminated non-aqueous secondary battery was produced in the same manner as in Example 1 except that poly(3,4-ethylenedioxy)thiophene [Clevios™ "PH500"] was used as a conductive polymer.

Example 3

<Production of Positive Electrode>

A positive electrode with leads was produced in the same manner as in Example 1 except that a positive electrode mixture layer was formed to be 125 μm thick after pressing.

<Production of Negative Electrode>

SiO (average particle size: 5.0 μm) was heated to about 1000° C. in an ebullated bed reactor. Mixed gas of methane and nitrogen gas at 25° C. was brought into contact with the heated particles to carry out CVD at 1000° C. for 60 minutes. Carbon resulting from the thermal decomposition of the mixed gas (hereinafter referred also to as the "CVD carbon") in this way was deposited on the SiO particles to form a coating layer, thus obtaining carbon-coated SiO as a negative electrode active material.

The composition of this negative electrode active material was calculated from changes in mass before and after the formation of the coating layer, and it was found that the ratio of SiO to CVD carbon was 85:15 (mass ratio).

Next, 5 parts by mass of the carbon-coated SiO and 85 parts by mass of graphite as negative electrode active materials, 2 parts by mass of Ketjen Black (average particle size: 0.05 μm) as a conductive assistant, 4 parts by mass of CMC and 4 parts by mass of SBR as binders were mixed with water, and mixing and dispersion of the components were carried out in a planetary mixer, thus preparing a negative electrode mixture containing slurry. Next, onto one side of a copper foil as a negative electrode current collector having a thickness of 7

μm, the negative electrode mixture containing slurry was applied in a certain thickness, followed by drying at 85° C. Thereafter, drying was carried out in a vacuum at 100° C. for 8 hours. Subsequently, the current collector was subjected to pressing by a roll pressing machine, thus producing a negative electrode including a negative electrode mixture layer having a thickness of 100 μm. When the negative electrode mixture containing slurry was applied to the copper foil, the slurry was not applied to a portion of the copper foil so that this portion would be exposed.

Next, this negative electrode was cut so that the negative electrode mixture layer would be 35 mm×35 mm in area and the exposed portion of the copper foil was kept included in the negative electrode. Further, a lead piece made of nickel for taking out current was welded to the exposed portion of the copper foil, thus obtaining a negative electrode with leads.

<Assembly of Battery>

A laminated non-aqueous secondary battery was produced in the same manner as in Example 1 except that the positive electrode with leads and the negative electrode with leads obtained above were used. In this example, the ratio between the positive electrode active material and the negative electrode active material in mass was 226.

Example 4

<Production of Positive Electrode>

A positive electrode with leads was produced in the same manner as in Example 1 except that poly(3,4-ethylenedioxy)thiophene [Clevios™ "PH500] was used as a conductive polymer and a positive electrode mixture layer was formed to be 125 μm thick after pressing.

<Production of Negative Electrode>

A negative electrode with leads was produced in the same manner as in Example 3.

<Assembly of Battery>

A laminated non-aqueous secondary battery was produced in the same manner as in Example 1 except that the positive electrode with leads and the negative electrode with leads obtained above were used.

Example 5

A laminated non-aqueous secondary battery was produced in the same manner as in Example 1 except that a positive electrode mixture layer was formed to be 70 μm thick after pressing.

Comparative Example 1

A laminated non-aqueous secondary battery was produced in the same manner as in Example 1 except that the composition of the positive electrode mixture containing slurry was modified by changing the content of the positive electrode active material to 92.5 parts by mass and not adding the conductive polymer.

Comparative Example 2

A laminated non-aqueous secondary battery was produced in the same manner as in Example 1 except that the composition of the positive electrode mixture containing slurry was modified by changing the content of the positive electrode active material to 92.8 parts by mass and not adding the conductive polymer and the organic silane compound.

Comparative Example 3

A laminated non-aqueous secondary battery was produced in the same manner as in Example 1 except that the composition of the positive electrode mixture containing slurry was modified by changing the content of the positive electrode active material to 92.49 parts by mass and the content of the conductive polymer to 0.01 parts by mass.

Comparative Example 4

A laminated non-aqueous secondary battery was produced in the same manner as in Example 1 except that the composition of the positive electrode mixture containing slurry was modified by changing the content of the positive electrode active material to 89.5 parts by mass and the content of the conductive polymer to 3.0 parts by mass.

Comparative Example 5

<Production of Positive Electrode>

A positive electrode with leads was produced in the same manner as in Example 1 except that the composition of the positive electrode mixture containing slurry was modified by changing the content of the positive electrode active material to 92.5 parts by mass and not adding the conductive polymer, and a positive electrode mixture layer was formed to be 125 μm thick after pressing.

<Production of Negative Electrode>

A negative electrode with leads was produced in the same manner as in Example 3.

<Assembly of Battery>

A laminated non-aqueous secondary battery was produced in the same manner as in Example 1 except that the positive electrode with leads and the negative electrode with leads obtained above were used.

Comparative Example 6

A laminated non-aqueous secondary battery was produced in the same manner as in Example 1 except that the composition of the positive electrode mixture containing slurry was modified by changing the content of the positive electrode active material to 92.8 parts by mass and not adding the conductive polymer and the organic silane compound, and a positive electrode mixture layer was formed to be 70 μm thick after pressing.

Comparative Example 7

A laminated non-aqueous secondary battery was produced in the same manner as in Example 1 except that the composition of the positive electrode mixture containing slurry was modified by changing the content of the positive electrode active material to 92.5 parts by mass and not adding the conductive polymer, and a positive electrode mixture layer was formed to be 70 μm thick after pressing.

Comparative Example 8

A laminated non-aqueous secondary battery was produced in the same manner as in Example 1 except that the composition of the positive electrode mixture containing slurry was modified by changing the content of the positive electrode active material to 92.57 parts by mass and not adding the organic silane compound, and a positive electrode mixture layer was formed to be 70 μm thick after pressing.

Comparative Example 9

A laminated non-aqueous secondary battery was produced in the same manner as in Example 1 except that the composition of the positive electrode mixture containing slurry was modified by changing the content of the positive electrode active material to 92.57 parts by mass and not adding the organic silane compound.

Table 1 provides the content of each positive electrode mixture layer component in the batteries of Examples 1 to 5 and Comparative Examples 1 to 9.

TABLE 1

|  | Positive electrode active material | Conductive polymer | Organic silane compound | Conductive assistant | Binder | PVP |
|---|---|---|---|---|---|---|
| Ex. 1 | 92.27 | 0.23 | 0.3 | 4.6 | 2.3 | 0.3 |
| Ex. 2 | 92.27 | 0.23 | 0.3 | 4.6 | 2.3 | 0.3 |
| Ex. 3 | 92.27 | 0.23 | 0.3 | 4.6 | 2.3 | 0.3 |
| Ex. 4 | 92.27 | 0.23 | 0.3 | 4.6 | 2.3 | 0.3 |
| Ex. 5 | 92.27 | 0.23 | 0.3 | 4.6 | 2.3 | 0.3 |
| Comp. Ex. 1 | 92.5 | — | 0.3 | 4.6 | 2.3 | 0.3 |
| Comp. Ex. 2 | 92.8 | — | — | 4.6 | 2.3 | 0.3 |
| Comp. Ex. 3 | 92.49 | 0.01 | 0.3 | 4.6 | 2.3 | 0.3 |
| Comp. Ex. 4 | 89.5 | 3.0 | 0.3 | 4.6 | 2.3 | 0.3 |
| Comp. Ex. 5 | 92.5 | — | 0.3 | 4.6 | 2.3 | 0.3 |
| Comp. Ex. 6 | 92.8 | — | — | 4.6 | 2.3 | 0.3 |
| Comp. Ex. 7 | 92.5 | — | 0.3 | 4.6 | 2.3 | 0.3 |
| Comp. Ex. 8 | 92.57 | 0.23 | — | 4.6 | 2.3 | 0.3 |
| Comp. Ex. 9 | 92.57 | 0.23 | — | 4.6 | 2.3 | 0.3 |

Next, the charge/discharge characteristics and charge/discharge cycle characteristics of the batteries of Examples 1 to 5 and Comparative Examples 1 to 9 were evaluated.

<Charge/Discharge Characteristics>

At 23° C., each battery was charged at a constant current of 1 C until the battery voltage reached 4.2V, and was charged at a constant voltage of 4.2V until the value of current became 0.1 CmA. Subsequently, each battery was discharged at a constant current of 1 C until the battery voltage declined to 2.5V, and the 1 C discharge capacity of each battery was measured.

Next, at 23° C., each battery was charged at a constant current of 2 C until the battery voltage reached 4.2V, and was charged at a constant voltage of 4.2V until the the value of current became 0.2 CmA. Subsequently, each battery was discharged at a constant current of 2 C until the battery voltage declined to 2.5V, and the 2 C discharge capacity of each battery was measured.

<Charge/Discharge Cycle Characteristics>

At 23° C., each battery was charged at a constant current of 2 C until the battery voltage reached 4.2 V and further charged at a constant voltage of 4.2 V until the value of current became 0.2 CmA. Then, each battery was discharged at a constant current of 2 C until the battery voltage declined to 2.5V. Given that a series of these operations was 1 cycle, each battery was charged/discharged repeatedly, and the capacity retention rate of each battery at 600th cycle was calculated from the following formula:

Capacity retention rate (%)=(discharge capacity at 600th cycle/discharge capacity at 1st cycle)×100.

The results are provided in Table 2. The thickness of each positive electrode mixture layer is also shown in Table 2.

TABLE 2

|  | 1 C discharge capacity (mAh) | 2 C discharge capacity (mAh) | Capacity retention rate (%) | Thickness of positive electrode mixture layer (μm) |
|---|---|---|---|---|
| Ex. 1 | 137 | 110 | 90 | 90 |
| Ex. 2 | 135 | 109 | 89 | 90 |
| Ex. 3 | 128 | 64 | 62 | 125 |
| Ex. 4 | 128 | 63 | 61 | 125 |
| Ex. 5 | 143 | 136 | 98 | 70 |
| Comp. Ex. 1 | 135 | 102 | 78 | 90 |
| Comp. Ex. 2 | 135 | 104 | 70 | 90 |
| Comp. Ex. 3 | 135 | 101 | 79 | 90 |
| Comp. Ex. 4 | 136 | 108 | 81 | 90 |
| Comp. Ex. 5 | 125 | 57 | 46 | 125 |
| Comp. Ex. 6 | 140 | 131 | 85 | 70 |
| Comp. Ex. 7 | 140 | 128 | 93 | 70 |
| Comp. Ex. 8 | 141 | 135 | 29 | 70 |
| Comp. Ex. 9 | 136 | 106 | 15 | 90 |

Of the batteries of Examples 1 to 5 of the present invention and the batteries of Comparative Examples 1 to 9, those having the same positive electrode mixture thickness were compared with each other. As is clear from Table 2, the batteries of Examples 1 to 5 had higher 2C discharge capacity and capacity retention rate than those of the batteries of Comparative Examples 1 to 9. On the other hand, for the batteries of Comparative Examples 1, 5 and 7 to which the conductive polymer was not added, the batteries of Comparative Examples 2 and 6 to which the conductive polymer and the organic silane compound were not added, the battery of Comparative Example 3 in which the content of the conductive polymer was 0.01 parts by mass, the battery of Comparative Example 4 in which the content of the conductive polymer was 3.0 parts by mass, and the batteries of Comparative Examples 8 and 9 to which the organic silane compound was not added, it is clear that their 2 C discharge capacity and capacity retention rate were smaller than those of the batteries of Examples 1 to 5 having the same positive electrode mixture layer thickness.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

DESCRIPTION OF REFERENCE NUMERALS 1 laminated non-aqueous secondary battery
2 outer package
3 positive electrode external terminal
4 negative electrode external terminal

The invention claimed is:

1. A non-aqueous secondary battery comprising a positive electrode, a negative electrode, a non-aqueous electrolyte and a separator,
  wherein the positive electrode includes a positive electrode mixture layer containing a positive electrode active material, a conductive polymer, an organic silane compound, a conductive assistant and a binder,
  the conductive polymer is polythiophene having an ether group at the third position of a thiophene ring, and
  the content of the conductive polymer is 0.05 to 0.5 mass % with respect to the total mass of the positive electrode mixture layer, and the surface of the positive electrode active material is coated with the organic silane compound.

2. The non-aqueous secondary battery according to claim 1, wherein the content of the organic silane compound is 0.05 to 3.0 mass % with respect to the total mass of the positive electrode mixture layer.

3. The non-aqueous secondary battery according to claim 1, wherein the content of the binder is 0.5 to 5.0 mass % with respect to the total mass of the positive electrode mixture layer.

4. The non-aqueous secondary battery according to claim 1, wherein the relationship $A/B \geq 1$ is established, where A is the content of the conductive assistant in mass % with respect to the total mass of the positive electrode mixture layer and B is the content of the binder in mass % with respect to the total mass of the positive electrode mixture layer.

5. The non-aqueous secondary battery according to claim 1, wherein the positive electrode mixture layer has a thickness of 70 to 300 µm.

6. The non-aqueous secondary battery according to claim 1, wherein the positive electrode active material includes a lithium-containing composite oxide including nickel, cobalt, and manganese as constituent elements and having a layer structure.

7. The non-aqueous secondary battery according to claim 1, wherein the negative electrode includes, as a negative electrode active material, a material including silicon and oxygen as constituent elements.

* * * * *